United States Patent
Wiser, III et al.

(10) Patent No.: US 11,524,257 B2
(45) Date of Patent: Dec. 13, 2022

(54) ANGLED ADSORBENT FILTER MEDIA DESIGN IN TANGENTIAL FLOW APPLICATIONS

(71) Applicant: Environmental Management Confederation, Inc., Rocky Hill, NJ (US)

(72) Inventors: Forwood C. Wiser, III, Kingston, NJ (US); Caitlin Naske, Springfield, VA (US)

(73) Assignee: Environmental Management Confederation, Inc., Rocky Hill, NJ (US)

( * ) Notice: Subject to any disclaimer, the term of this patent is extended or adjusted under 35 U.S.C. 154(b) by 0 days.

(21) Appl. No.: 16/039,278

(22) Filed: Jul. 18, 2018

(65) Prior Publication Data

US 2019/0022571 A1 Jan. 24, 2019

Related U.S. Application Data

(60) Provisional application No. 62/533,840, filed on Jul. 18, 2017.

(51) Int. Cl.
  *B01D 53/02* (2006.01)
  *B01D 53/04* (2006.01)
  (Continued)

(52) U.S. Cl.
  CPC ..... *B01D 53/0407* (2013.01); *B01D 53/0415* (2013.01); *B01D 53/523* (2013.01);
  (Continued)

(58) Field of Classification Search
  CPC ........ B01D 2253/102; B01D 2253/308; B01D 2253/311; B01D 2253/3425;
  (Continued)

(56) References Cited

U.S. PATENT DOCUMENTS 3,209,074 A   9/1965 French
3,873,287 A * 3/1975 Barnebey ........... B01D 46/0013
                                        96/129

(Continued)

FOREIGN PATENT DOCUMENTS

EP      3290900 A1    3/2018
JP      57-043817 U   3/1982
(Continued)

OTHER PUBLICATIONS

"Phresh® Duct Silencers," accessed at http://www.phreshfilter.com/shop/bycategory/air-purification/phresh-duct-silencers, retrieved on Jan. 6, 2017, pp. 1-2.

(Continued)

*Primary Examiner* — Christopher P Jones
(74) *Attorney, Agent, or Firm* — Schott, P.C.

(57) ABSTRACT

A media design for modular use in an air cleaning or HVAC systems to removes gas phase contaminants. The design allows for a control of gas contaminant removal using variable media length, path length, and contact time to ensure a contained MTZ length and low pressure drop. In one embodiment, the design includes a filter module at an angle to an airflow and an air filter mounted within the filter frame. The filter module may include channels therethrough that are oriented at the optimum angle in relation to the airflow to provide the required dwell time and pressure drop for a given application.

19 Claims, 11 Drawing Sheets

(51) Int. Cl.
- *B01D 53/56* (2006.01)
- *B01D 53/62* (2006.01)
- *B01D 53/52* (2006.01)
- *F24F 3/167* (2021.01)
- *F24F 8/10* (2021.01)
- *F24F 8/158* (2021.01)

(52) U.S. Cl.
CPC ............ *B01D 53/56* (2013.01); *B01D 53/62* (2013.01); *F24F 3/167* (2021.01); *F24F 8/10* (2021.01); *B01D 2253/102* (2013.01); *B01D 2253/308* (2013.01); *B01D 2253/311* (2013.01); *B01D 2253/3425* (2013.01); *B01D 2257/302* (2013.01); *B01D 2257/304* (2013.01); *B01D 2257/404* (2013.01); *B01D 2257/504* (2013.01); *B01D 2257/708* (2013.01); *B01D 2258/06* (2013.01); *F24F 8/158* (2021.01)

(58) Field of Classification Search
CPC ........ B01D 2257/302; B01D 2257/304; B01D 2257/404; B01D 2257/504; B01D 2257/708; B01D 2258/06; B01D 53/0407; B01D 53/0415; B01D 53/523; B01D 53/56; B01D 53/62; F24F 2003/1625; F24F 3/1603; F24F 3/161
See application file for complete search history.

(56) References Cited

U.S. PATENT DOCUMENTS

| | | |
|---|---|---|
| 4,259,092 A | 3/1981 | Matsuo et al. |
| 4,300,918 A | 11/1981 | Cary |
| 4,316,522 A | 2/1982 | Hirschorn |
| 4,533,015 A | 8/1985 | Kojima |
| 4,620,691 A | 11/1986 | Waters, Jr. |
| 4,628,386 A | 12/1986 | Chabrolle |
| 4,660,676 A | 4/1987 | Eustace |
| 4,671,126 A | 6/1987 | Sable |
| 4,790,259 A | 12/1988 | Morris et al. |
| 4,908,634 A | 3/1990 | Arimoto et al. |
| 5,120,331 A | 6/1992 | Landy |
| 5,147,722 A | 9/1992 | Koslow |
| 5,184,706 A | 2/1993 | Christenson |
| 5,274,201 A | 12/1993 | Steele |
| 5,313,803 A | 5/1994 | Detzer |
| 5,663,535 A | 9/1997 | MacDonald et al. |
| 5,766,072 A | 6/1998 | Andersson |
| 5,792,513 A | 8/1998 | Koslow et al. |
| 5,979,598 A | 11/1999 | Wolf et al. |
| 5,983,888 A | 11/1999 | Anselmino et al. |
| 6,102,153 A | 8/2000 | Willke, Jr. |
| 6,273,938 B1 | 8/2001 | Fanselow et al. |
| 6,355,330 B1 | 3/2002 | Koslow et al. |
| 6,574,123 B2 | 6/2003 | Wiser, III et al. |
| 6,892,851 B2 | 5/2005 | Lee |
| 7,141,101 B2 | 11/2006 | Amann |
| 7,431,127 B2 | 10/2008 | de Borchgrave et al. |
| 7,581,619 B1 | 9/2009 | Storm |
| 7,686,869 B2 | 3/2010 | Wiser et al. |
| 7,691,186 B2 | 4/2010 | Wiser |
| 7,708,813 B2 | 5/2010 | Wiser et al. |
| 7,819,223 B2 | 10/2010 | Celik et al. |
| 8,070,861 B2 | 12/2011 | Wiser et al. |
| 8,087,492 B2 | 1/2012 | Cursetjee et al. |
| 8,210,308 B2 | 7/2012 | Penner et al. |
| 8,252,095 B2 | 8/2012 | Wiser et al. |
| 8,252,097 B2 | 8/2012 | Wiser |
| 8,408,357 B2 | 4/2013 | Cheung |
| 8,701,821 B2 | 4/2014 | O'Coimin et al. |
| 8,795,601 B2 | 8/2014 | Wiser et al. |
| 8,814,994 B2 | 8/2014 | Wiser et al. |
| 9,380,382 B2 | 6/2016 | Hopkins |
| 9,764,331 B2 | 9/2017 | Wiser et al. |
| 9,789,494 B2 | 10/2017 | Wiser, III et al. |
| 9,861,990 B2 | 1/2018 | Wise |
| 2002/0110510 A1 | 8/2002 | Seguin et al. |
| 2003/0183083 A1* | 10/2003 | Hau-Cheng Fu ........ B01J 20/20 96/153 |
| 2006/0272888 A1 | 12/2006 | Lucas et al. |
| 2014/0165832 A1* | 6/2014 | Antoun .................. B01D 45/14 95/270 |
| 2015/0056910 A1 | 2/2015 | Ikeda et al. |
| 2016/0067647 A1 | 3/2016 | Tate et al. |
| 2016/0303499 A1 | 10/2016 | Wiser |

FOREIGN PATENT DOCUMENTS

| | | |
|---|---|---|
| JP | 02-115015 A | 4/1990 |
| JP | 2003-507154 A | 2/2003 |
| WO | 94/02192 A1 | 2/1994 |
| WO | 2016/077338 A1 | 5/2016 |
| WO | 2016/174866 A1 | 11/2016 |
| WO | 2019/018581 A1 | 1/2019 |

OTHER PUBLICATIONS

Extended European search report received for EP Application No. 18835699.2, dated Jun. 23, 2020, 8 pages.

International Search Report and Written Opinion received for PCT Application No. PCT/US2018/042774, dated Nov. 19, 2018, 9 pages.

Communication Pursuant to Article 94(3) issued by the European Patent Office dated Feb. 17, 2022 in the European Patent Application No. 18835699.2, Feb. 17, 2022, 6 pages.

Reason for Refusal Issued from the Japanese Patent Office within the corresponding Japanese Application No. 2020-524726, dated May 24, 2022, 4 pages.

English Translation of Reason for Refusal Issued from the Japanese Patent Office within the corresponding Japanese Application No. 2020-524726, dated May 24, 2022, 9 pages.

* cited by examiner

AIR FLOW

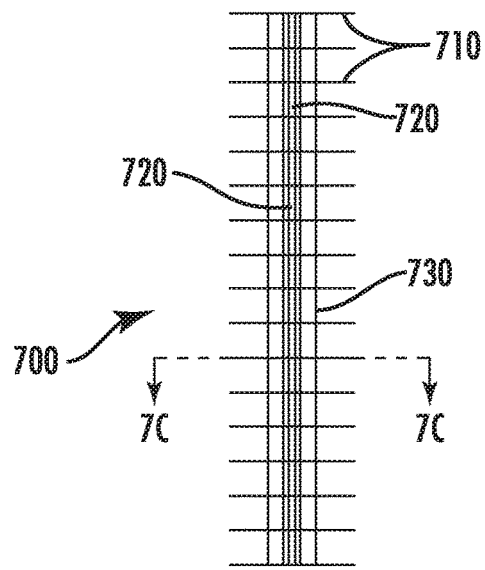 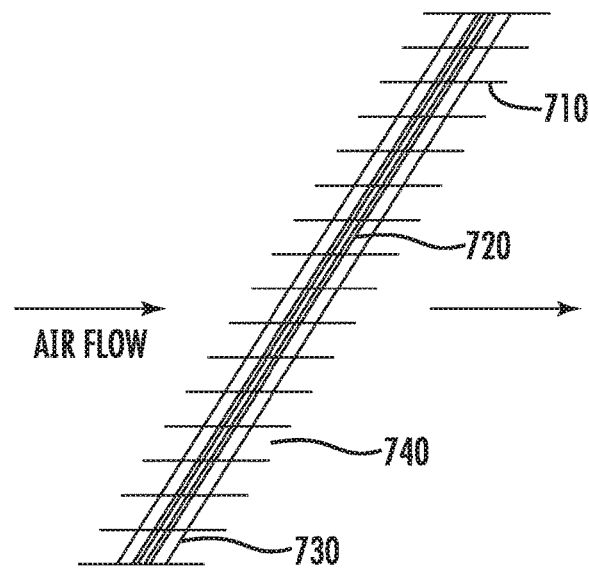
FIG 7A
FIG 7B
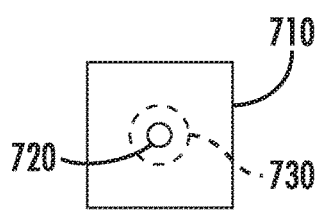 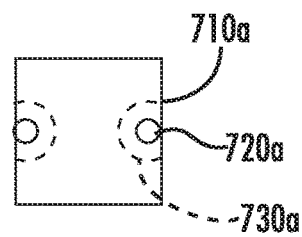
FIG 7C
FIG 7D
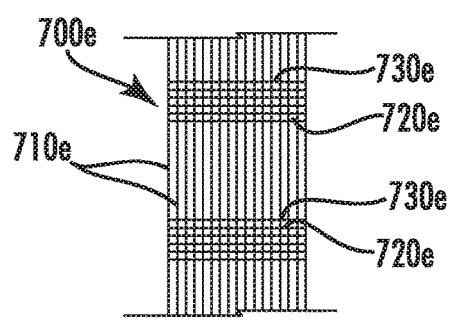
FIG 7E

ANGLED ADSORBENT FILTER MEDIA DESIGN IN TANGENTIAL FLOW APPLICATIONS

BACKGROUND

In recent years the purification of indoor air has become more prevalent due to the health implications for the building occupants. The EPA defines indoor air quality (IAQ) as "the air quality within and around buildings and structures, especially as it relates to the health and comfort of building occupants." Poor IAQ can be tied to symptoms like headaches, fatigue, trouble concentrating, and irritation of the eyes, nose, throat and lungs. Air quality is also critical for the processes and equipment in buildings. Data centers, for example, have few people but many servers that are sensitive to airborne contaminants. These contaminants may fall into three broad categories: particle, biological, and gas phase. Although gas phase contaminants may be discussed in detail herein, the application of the filter described below is not so limited. Similarly, although the description mentions "air flow" and "air filter," other fluids may be filtered using the filter discussed herein.

Gas phase contaminants come from a myriad of indoor and outdoor sources and can have a variety of deleterious effects on the occupants and operations in a building. For example, volatile organic compounds (VOC's) may be found in indoor air from paint, carpeting, copiers/printers, laminated furniture, wood preservatives, paint thinner, glues, permanent markers, cosmetics, and certain aerosols and plastics. Exposure to VOCs may cause symptoms from nausea and headaches to liver or lung damage. Further, the occupants of a building generate $CO_2$ that must also be diluted or removed.

A wide range of gas phase contaminants can also be found in indoor air from outside sources such as exhaust, decaying vegetation, agricultural burns, industrial manufacturing, water treatment, and chemical plants. Contaminants can vary greatly from $H_2S$, $SO_2$ and other sulfur-based compounds in pulp and paper mills, to $SO_2$, NOx, and hydrocarbons in engine exhaust.

Further, there are a number of applications where a process or product inside a building creates odors and gas phase contaminants that must be removed before the air can be exhausted to the outdoors, for example, terpenes in marijuana greenhouses and grow facilities.

To maintain contaminants at acceptable levels, gas phase contaminants may be removed or diluted with relatively clean air. Both have operational and energy implications for a building. Outdoor air must be clean for it to be used for dilution. Many urban areas do not have air of sufficient quality and it must be cleaned before it can be used. Further, even if the air is clean enough, it must be conditioned (heated, cooled, and/or humidity controlled) before it can be introduced into a building. Gas phase contaminant removal systems can be large, expensive, difficult to install and costly to maintain. Gas phase contaminant removal has generally been achieved by putting air in contact with adsorbents, absorbents, chemi-sorbents, photocatalysts, catalysts or other material with removal properties, referred to herein as sorbets. These may be used, combined with each other, or with other materials to form an effective filter media.

Activated carbon is one sorbent commonly used in IAQ for the removal of gas phase contaminants and occurs in several different physical structures including powder, granular, pellets, paper, and honeycombs. Activated carbon may be made from a wide variety of materials including coal, coconut shell, and wood. The starting material and activation process influence the pore structure and pore volume in the final activated carbon product. Most adsorption occurs in the mesopores and micropores (less than 50 nm diameter) therefore choosing an activated carbon that maximizes the pore volume under 50 nm is a consideration, though not necessarily the only one, in the overall performance of the media.

Mass Transfer Zone (MTZ)

Mass transfer is a term that may be used when using sorbent media to remove gas phase contaminants from an airstream. An MTZ length determines the efficiency and lifetime of the media rather than capacity but is not typically used in industry as it is difficult to measure and can be time consuming and difficult to measure.

Ultimate capacity and mass transfer zone (MTZ) length are two relevant factors in designing a sorbent system to capture gas phase contaminants. Ultimate capacity refers to the total weight of a given contaminant that a sorbent can adsorb and is a percentage of the sorbent weight (wt. contaminant/wt. sorbent). The ultimate capacity is typically measured at elevated concentrations well above application concentrations and differs for each contaminant and sorbent pair. MTZ is the section in a sorbent where active adsorption occurs and the MTZ length depends on the sorbent (type, amount, structure, etc.) and the conditions (face velocity, contaminant, concentration, etc.).

MTZ length may become a more critical design factor when using sorbent media in the relatively short depth that is typical or available in most applications. The media depth should be at a minimum equal to the MTZ to provide 100% efficiency. As shown in FIG. 1A, the MTZ 21 starts at the inlet 22 of the sorbent column and moves through the depth of the media as the sorbent becomes consumed. The sorbent above the MTZ is saturated with a given challenge gas 23 and no longer has active adsorption. Below the MTZ there is new sorbent 25 that the gas contaminant has not reached yet. Breakthrough occurs when the MTZ 21 moved through the full column of sorbent and the MTZ leading edge 2X reaches the end of the sorbent, no longer capturing the gas contaminant. The MTZ length determines the efficiency and lifetime of the media of a given depth rather than capacity and yet most manufacturers report sorbent media capacity values for design purposes; said another way, high capacity does not necessarily equate to efficiency in all contexts.

Further Air Filtration Background

Another factor in the use of gas phase removal media is resistance to airflow or pressure drop. Air cleaning is often employed in the heating, cooling and ventilation (HVAC) system of a building. Many HVAC systems do not have powerful enough fans for additional pressure drop, limiting the application of air cleaning in existing systems. Even when fans are large enough and/or the need for air cleaning was considered in the original design, high pressure drop may increase energy and operational costs.

Sorbent material used to capture gas phase contaminants may be in pellet form. The most widely-used commercial carbon filtration systems use 1-3 inches deep square or rectangular 24×24 inches perforated "trays" filled with carbon pellets. Pellet tray modules have high resistance to airflow and these systems require powerful fans. Further, carbon pellet systems shed carbon dust and downstream particle filters are necessary, resulting in additional pressure drop as well as additional space requirements. Pellet trays provide random airflow channels and the moving air will seek out the shortest path therethrough, rendering some portions of the pellet tray unused or under-used. Over time pellets are subject to diurnal and seasonal swings in temperature and humidity as well as constant vibrations leading to granular residue break off. Eventually the residue will plug screen material or leave the module and enter the downstream airflow. Vibration can also lead to settling in loose fill media creating channels or gaps allowing untreated, contaminant laden air to pass through modules. To overcome these problems and the uncertain MTZ length, pellet systems for critical applications must be quite deep, further increasing pressure drop.

In typical applications, the pellet trays are arranged in angled arrays to increase surface area and lower pressure. The air will take the shortest path through the pellet bed and therefore only have 1-3 inches of media path length, which may be less than required to capture the MTZ. In addition, pellets are typically 2-4 mm in diameter, which may make the sorbent at the center of the pellets difficult to access, especially with the air flows and contact times in a typical system.

Another form for applying granular or pelletized sorbent material, such as activated carbon, is as a layer in a multi-layer media, wherein the adsorbent material is sandwiched or immobilized between layers of an air-permeable media. This media would be closed enough and/or the adsorbent would be bound together sufficiently to prevent dust from migrating into the airstream. Typically, this layered assembly is between ⅛ inch and ¼ inch in overall thickness and is pleated and made into an assembly of varying depths. This is an effective means of getting a reasonable mass of adsorbent into the airstream, but because the air will take the shortest path through the media, the required depth to capture the MTZ is rarely achieved and efficiencies are typically low.

One material alternative to pellets to capture VOCs and other gas phase contaminants is the use of ceramic bound activated carbon honeycombs. Typically, these have a square grid cross-section and are extruded, dried, calcined at high temperature, cut to length, and assembled into modules. These honeycombs introduce certain advantages:

20-70% lower pressure drop, compared to pellet tray modules;

Estimated half the weight of a pellet tray system;

Fast and effective media contact at velocities up to six times greater than traditional pelletized carbon beds;

Sorbent is fully accessible allowing for shorter MTZ lengths, higher efficiency and full utilization of media; and Dust-free media with a stable structure eliminating the need for post filtration.

Honeycomb modules can be any depth, but for typical HVAC applications, due to space and pressure drop considerations, they are usually arrayed in nominal two inches deep square or rectangular panels and installed into flat or angled racks in the system. Two inches of media is a relatively short path length and often less than the MTZ of a given contaminant. This can result in low efficiencies and/or unused capacity for some contaminants or challenging environments.

The effectiveness of the structure is a function of contact/dwell time amongst other factors. Because the available cross-sectional area is sometimes limited, to increase dwell time, the structures are often angled with respect to the airflow to form a "V". This slows the air flow down and increases dwell time increasing efficiency and decreasing the MTZ length.

For example, a duct may have a 24×24 inches cross section with a single flat 24×24×2 inches panel of carbon honeycomb and an airflow of 2,000 cfm. The media velocity is ~500 fpm. If two of these panels are formed into a "V" in the airstream, each sees 1,000 cfm and the media velocity is now 250 fpm. This slows the airspeed through each panel and results in a shorter MTZ length thus increasing the efficiency of the media.

The honeycomb channels usually keep their shape versus the flow. Therefore, the air must make two sharp turns to flow through the structure and continue down the duct. This adds pressure drop and is not an efficient use of the space to maximize path length.

While these honeycomb systems represent a cutting edge of current technology, they can also be improved upon, especially to increase air path length, efficiency, operational life, and design and sorbent material flexibility, as well as decrease turbulence, and improve removal performance. The carbon honeycombs, at least currently, are also quite expensive compared to other filter systems and therefore limited in their use beyond specialized applications.

FIG. 1 shows one possible filter assembly 50 within an air duct or passage 90, for use with a filter media. As shown, there is an air flow from left to right. Air passing from the left to the right travels through the filter assembly 50, which includes two (as shown, although more or less are possible) filter modules 60. The filter modules 60 engage at a mounting end 62 with a mounting sleeve or assembly 80 having a channel 82 sized to receive the mounting ends 62, and the filter module 60 and/or the channel 82 may include a seal 84 at a second end, which may also include a mounting sleeve. The seal 84 to prevent air passage around the filter assembly 50. The filter modules 60 facing ends 63 meet at a filter module seal 65 (represented graphically rather than showing actual channels or joints) that further prevents air passage around the filter assembly 50.

The filter modules 60 may include a frame 64 that contains within it a filter material 66. The frame and filter materials may be of a type described in at least U.S. Pat. Nos. 3,209,074; 4,620,691; 4,628,386; 4,671,126; 4,790,259; 4,908,634; 5,184,706; 6,574,123; 7,686,869; 7,691,186; 7,708,813; 8,070,861; 8,252,095; 8,252,097; 8,795,601; 8,814,994; 9,764,331; 9,789,494; 9,861,990, and US Patent Application Publication 2016/0303499, the contents of which are incorporated by reference as if fully set forth herein.

The attachment points between the filter assembly and the duct 70 and between adjacent filter modules 72 may create areas that prevent passage of the airflow. This may result in turbulence of flow, increased pressure drop, and uneven air flow through the filter assembly 50. So, while angling the honeycomb module increases the surface area and lowers pressure drop versus a flat module, the decrease is less that linear due to the blocked airflow, uneven airflow and changes of direction.

There are many applications where air, liquids, or gases flow through similarly angled structures that are designed to bring about some change (e.g. heating, cooling, cleaning) through tangential contact with the structure. Examples of this would be a coil in an HVAC system, a radiator in a car, or a carbon honeycomb matrix in an airstream.

Based on the above, there are many challenges related to flow through filters in a broad range of applications.

SUMMARY OF THE INVENTION

A media design for modular use in an air cleaning or HVAC system to removes gas phase contaminants. The design allows for a control of gas contaminant removal using variable media length, path length, and contact time to ensure a contained MTZ length and low pressure drop. In one embodiment, the design includes a filter module at an angle to an airflow and an air filter mounted within the filter frame. The filter module may include channels therethrough that are oriented at the optimum angle in relation to the airflow to provide the required dwell time and pressure drop for a given application.

For the sake of clarity, the following descriptions refer to a horizontal duct arrangement and airflow. However, in an actual application the ductwork may run vertically or at an angle. Further, the modules themselves may be rotated in the duct.

BRIEF DESCRIPTION OF THE DRAWINGS

FIGS. 7A, 7B, 7C, 7D, and 7E show another alternative filter module.

DETAILED DESCRIPTION OF THE EMBODIMENTS

Filter Media Module

Figure 1A:
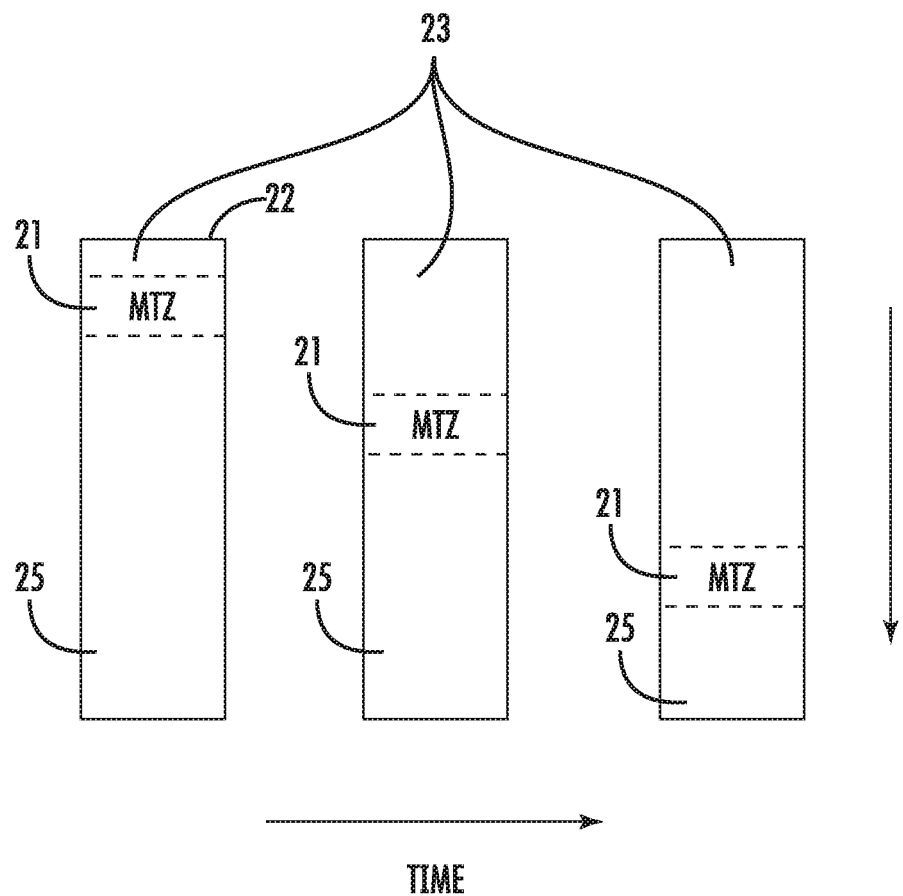
FIG. 1A shows a mass transfer zone application example.
Figure 1B:
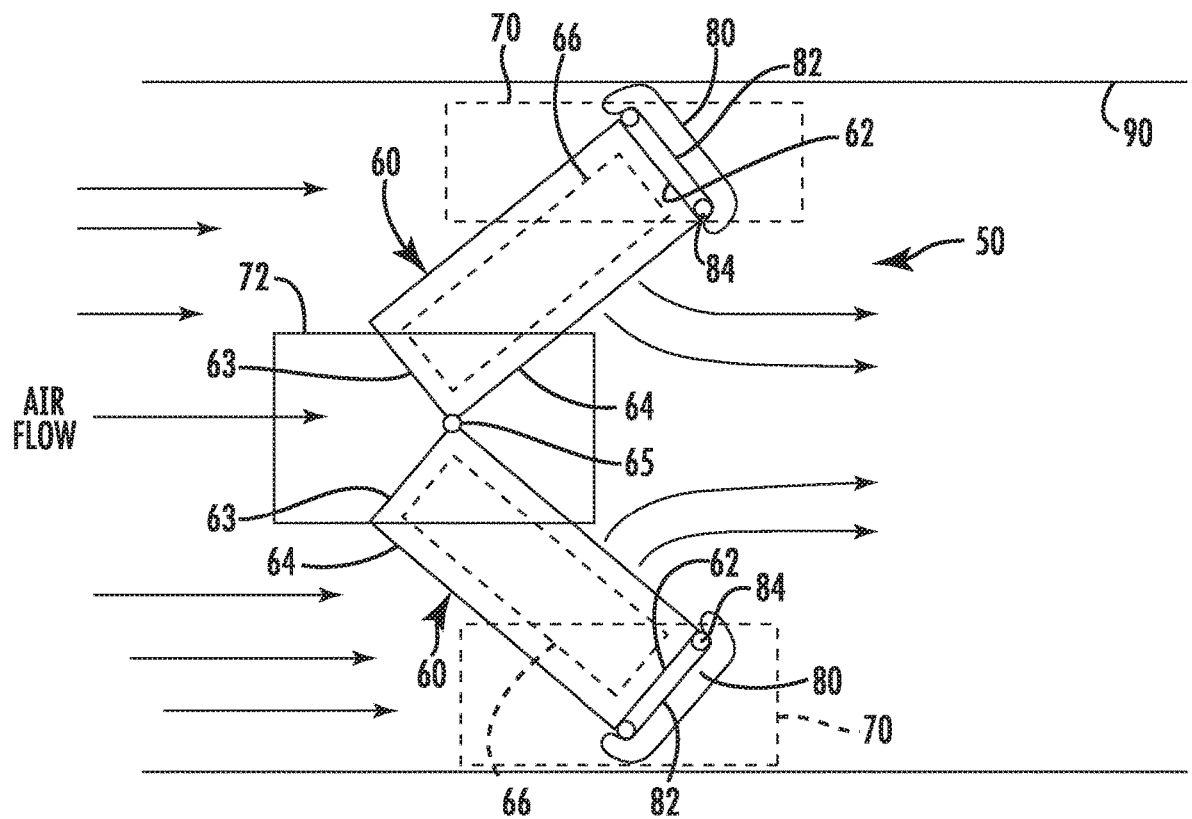
FIG. 1B shows a filter arrangement of the prior art.

As shown in FIGS. 2A-2E, 3A and 3B, 4A-4D, 5A, 5B, an air filter module 200, 400, may be removably placed within in an air filter system 300 (generally called "air filter" herein) that itself may be removably placed within an air duct or passage 90 to filter air passing therethrough. In order to maximize the filter media 214, 414 exposure to the air flow to be filtered, and to minimize pressure drop, a filter module 200, 400 may be angled to the air flow, with it being appreciated that the shortest path for air flow from a front of the filter module (facing the air flow) to the back of the filter module is defined as the thickness 213 through the cross sectional line 2B, 2C, 2D, 2E-2B, 2C, 2D, 2E, which contrasts with the longer channel air flow path lengths through the channels as described throughout this application.

For example, channels 212, 212a, 412, 412a through the filter module 200, 400 may be oriented parallel to the air flow to minimize pressure drop through the filter module 200, 400 and increase path length of air flow (and media 214 exposure to the air flow). In the parallel channel arrangement, the possible path length is defined within the area within the channel 212 exposed to filter media 214 and is roughly rectangular in FIG. 2C and additionally exists between the beads 217 in FIG. 2B, which allow for a more meandering path length therethrough. In the embodiment shown in FIGS. 2D, 2E, 5A, and 5B, however, the path length is shaped differently, and creation of turbulence in the air flow using meandering channels may create even more airflow to filter media exposure due to length of the channels and duration within the filter module 200.

The channels are defined between parallel layers of filter media 214, 414, of material types defined below. Within the filter module 200 in FIGS. 2A-2C, which has vertically oriented filter media 214, spacers 216 define the bottom and tops of channels 212, 212a, and also space apart parallel layers of the filter media 214. The spacers 216 may be of any effective size and height that meets design requirements of the air filter 300, and given the ease of assembly, designing a filter with more or less space between layers of filter media 214 would a straightforward matter of changing the height/thickness of the spacer application. Further, layers of filter media 214, 414, of material may be of varying thicknesses and widths.

Figure 2A:
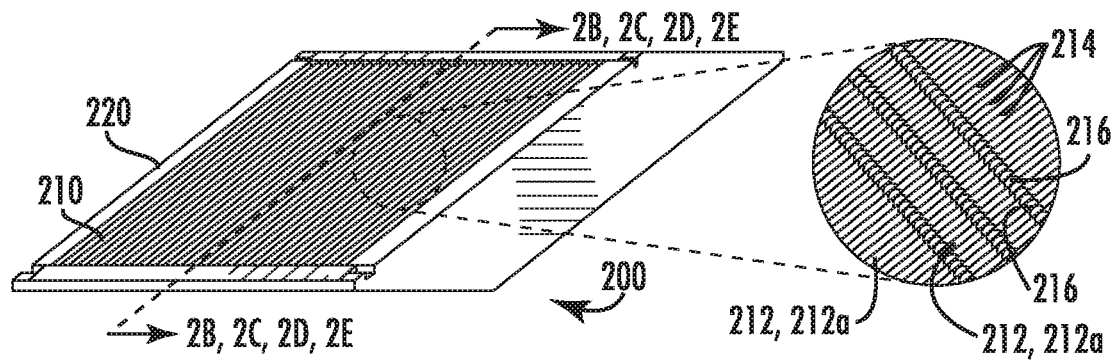
FIG. 2A shows a side isometric view of a filter module.
Figure 2B:
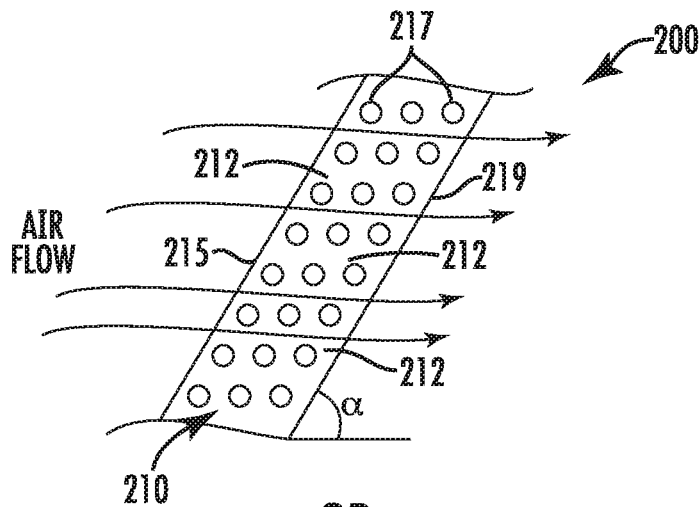
FIGS. 2B, 2C. 2D, and 2E show side cross sections through the lines 2B-2B, 2C-2C, 2D-2D, and 2E-2E respectively in FIG. 2A.

As FIG. 2B shows, the spacers 216 may be generally circular beads 217, formed in parallel rows that direct air flow across the filter media 214 in order to filter compounds both within the channels 212 and between beads 217 within the same row. The beads 217 may have a semispherical shape or a more flattened cylindrical shape, and they may be formed from adhesive or other polymer that is cured prior to application to prevent joining with adjacent filter media layers 214 (though such joinder may be desired in some context), or in such a way as to engage both sides of a filter media layer.

Figure 2C:
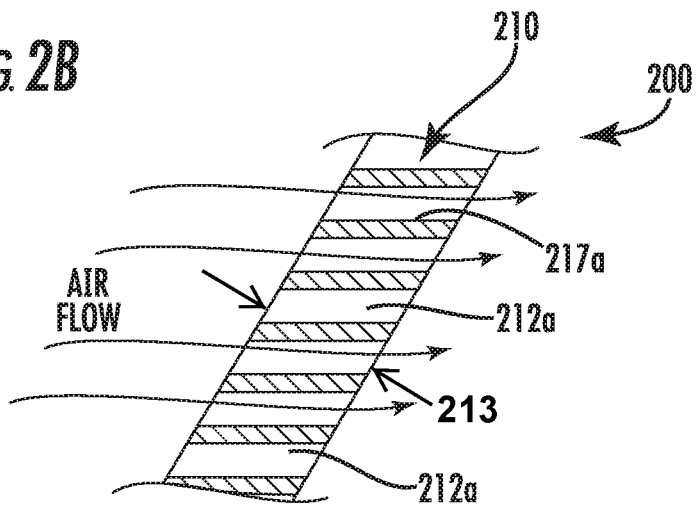

FIG. 2C shows an embodiment where instead of the spacers 216 being individual beads 217, they are formed as lines 217a having an elongated shape. These elongated lines 217a better define the channels 212a and may promote less turbulent air flow through the filter module 200. The lines 217a may be shaped with a semispherical cross section or flattened similar to the beads 217.

The beads 217 and lines 217a, 217d, 217e may be combined in a filter module 200 and may be shaped as tear drops or with similar aerodynamic structures—or squared off—in any shape that promotes effective filtration through the filter module 200. Different paths 212 may be formed between layers of filter media 214, or even between the same two parallel sheets of filter media 214.

The beads 217 or lines 217a may be silicone, acrylic, epoxy, hot melt, or urethane based where the viscosity of the adhesive allows for the formed bead to retain the desired height of the channel. The adhesive may be dispensed using a hand gun, stationary nozzles over a moving web or a programed glue machine.

The chosen adhesive may be a hot-melt adhesive, which would cure quickly, would not add to the VOCs in the air after it has cured and withstand typical HVAC conditions. Examples of such adhesives may include Henkel Loctite adhesive (which may be of different kinds, listed as low or zero VOCs), Technomelt 232 hot melt adhesive (ethylene vinyl acetate, EVA), a 3M 100% solids hot melt (EVA), or Dow Corning brand silicone hot-melt adhesives with reduced VOCs.

The adhesive may also be minimized to reduce the amount of adsorbent media that is blocked/blinded. Also, the formed channels may not have to be continuous or parallel; the adhesive may act as the method to keep the adsorbent sheets separated and prevent the media from sagging.

The spacers 216 may also include additives to improve filtration or add properties not included in the filter media to further improve the filtration process, and thus not only serve a structural purpose but a filtration one.

Figure 2D:
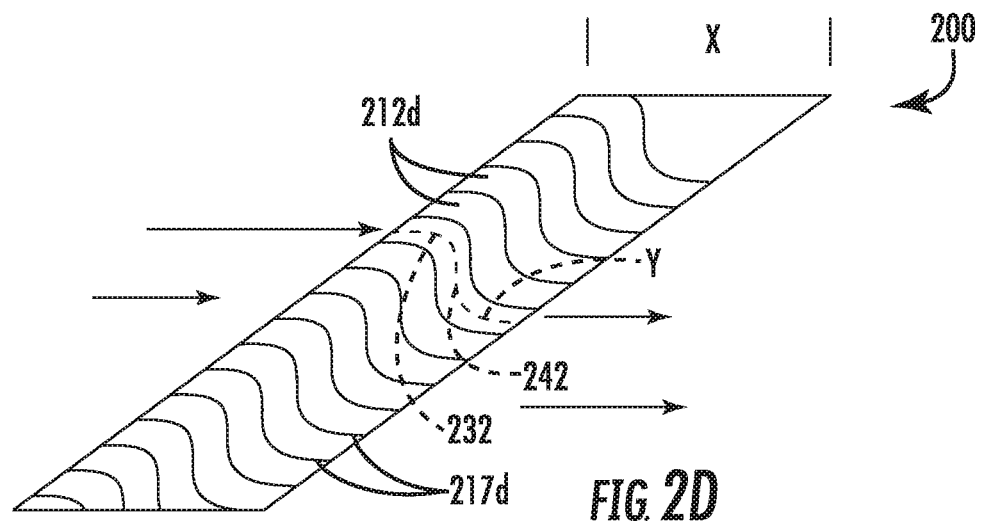
Figure 2E:
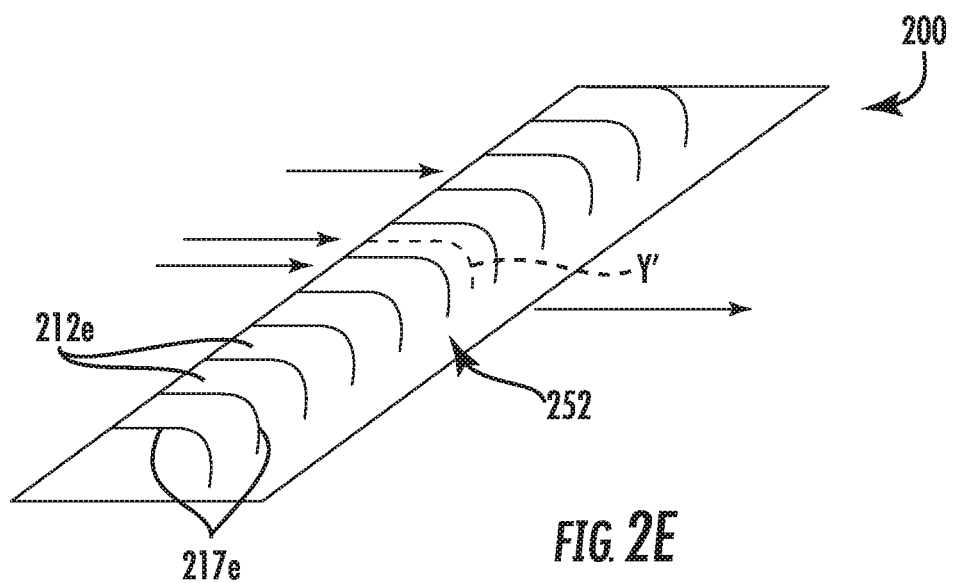

FIGS. 2D and 2E show another embodiment of the filter module 200 where the channels 212d and 212e are not directing the airflow through the shortest path through the filter, but instead direct airflow in a meandering path with portions parallel to airflow 232, and portions not parallel to the airflow 252. The paths y and y' provide added exposure to the filter media 214 over straight paths therethrough because y>x and y'>x as shown—and thus create additional path length. In FIG. 2E, the path y' terminates within the filter module, and may provide for a turbulent zone 252 within the filter module 200 before the airflow exists the filter module 200. The meandering channels y and y' may increase the exposure of the airflow to the filter media, i.e., increase the path length for air flow. The meandering channels y and y' may also allow for specific increased path length and media exposure to meet filtration requirements, while retaining existing infrastructure that only provides for filter width of x (x is commonly 2 inches).

Figure 4A:
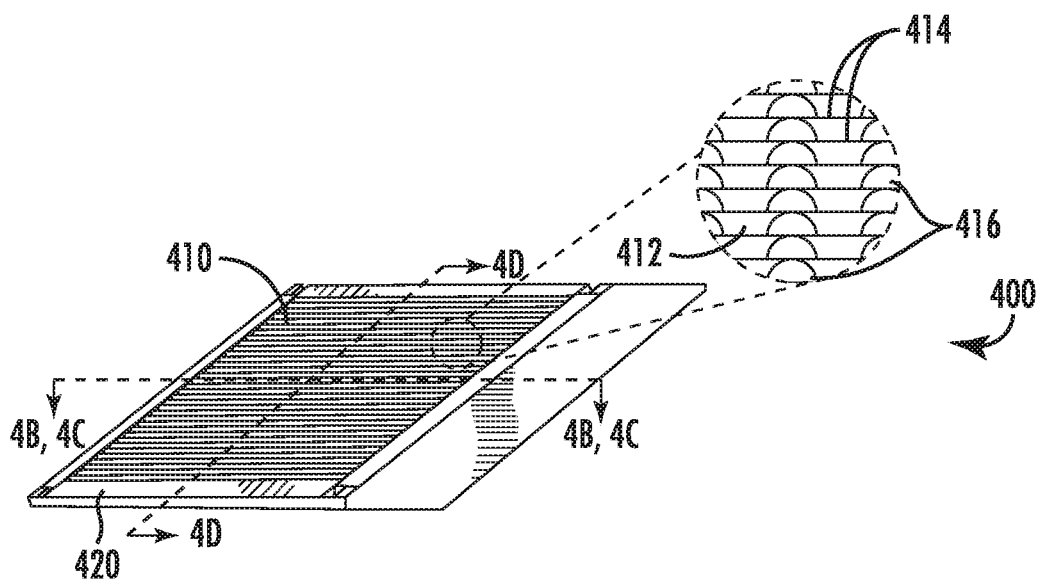
FIG. 4A shows an alternate front view of a filter module.
Figure 4B:
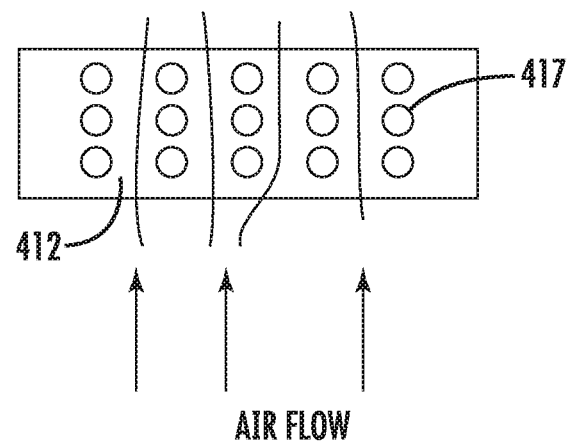
FIGS. 4B and 4C show side cross sections through the lines 4B-4B and 4C-4C respectively in FIG. 4A.

The filter module 400 of FIGS. 4A-4D is similar to that of FIGS. 2A-2C except that the filter media layers 414 are oriented horizontally between spacers 416 define the sides of channels 412, 412a, and also space apart parallel layers of the filter media 414. As FIG. 4B shows, the spacers 416 may be generally circular beads 417, formed in parallel rows that direct air flow across the filter media 414 in order to filter compounds both within the channels 412 and between beads 417 within the same row.

Figure 4C:
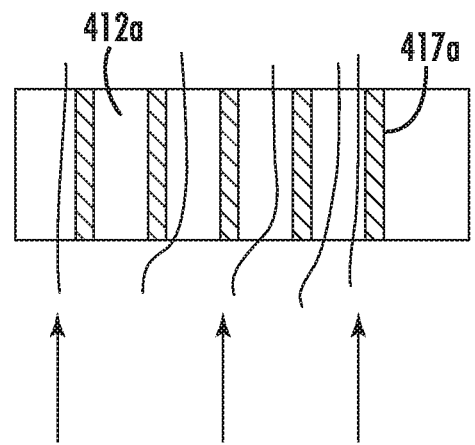
Figure 4D:
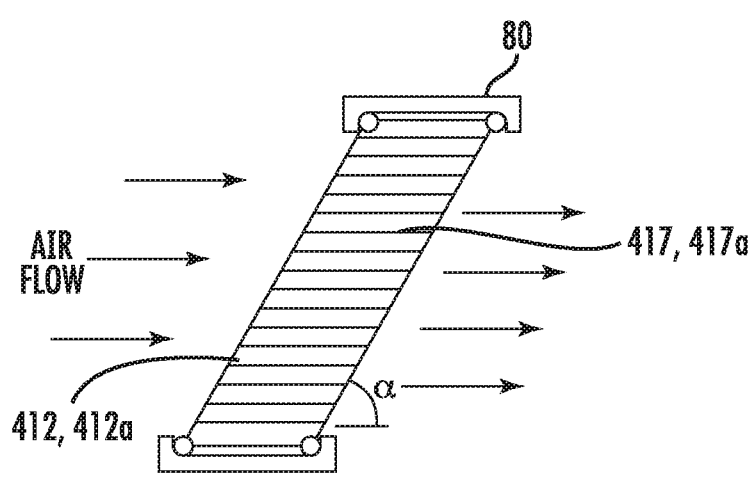
FIG. 4D shows a side view through the lines 4D-4D in FIG. 4A.

FIG. 4C shows an embodiment where instead of the spacers 416 being individual beads 417, they are formed as lines 417a having an elongated shape. These elongated lines 417a better define the channels 412a and may promote less turbulent air flow through the filter module 400.

The filter modules 200, 400 may be combined side by side or end to end in order to extend their lengths, or they may include interim supports therein to prevent sagging of the filter media 214, 414, since such media may be prone to deformation.

Figure 5A:
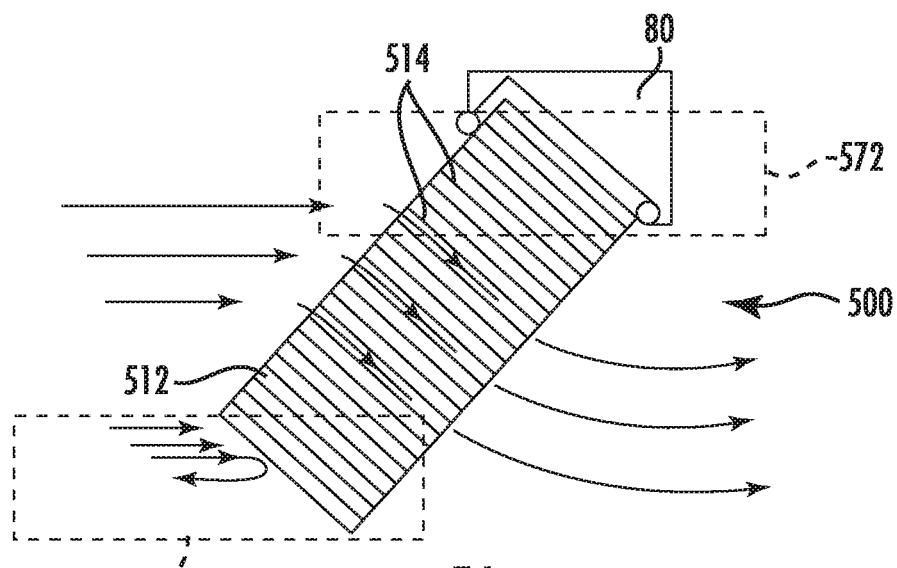
FIGS. 5A and 5B show an alternate side view of the view of FIG. 4D.
Figure 5B:
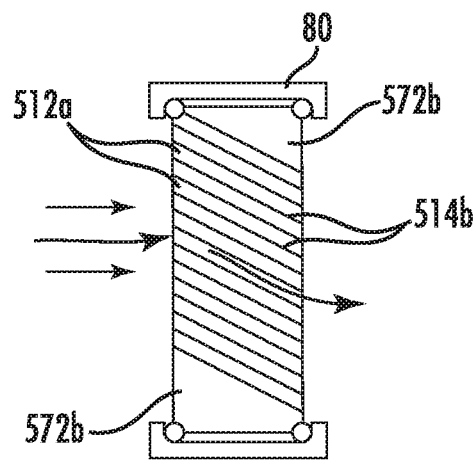

FIGS. 5A and 5B show examples that may be necessary in retrofit or limited spaces. FIG. 5A shows an angled filter module 500 with channels 512 defined by beads or lines therethrough that could be used with a mounting 80. Such a design could use filter media layers 514 oriented vertically or horizontally (as shown). This may provide more pressure drop and introduce areas of less air flow 572 through the filter module 500, but it may also prove beneficial in some filtering environments.

FIG. 5B shows an angled filter media that may be usable in some of the more common frame racks including sleeves 80 that are not offset from one another and shaped to accept a rectangular filter module. In such an arrangement, the channels 512a may be angled between spacers 514b. The media could be oriented vertically or horizontally but in any event, the angle of the channels 512a may create an increased path length, while also creating areas of more turbulent flow 572b, where the channels 512a are not a uniform height.

Figure 3B:
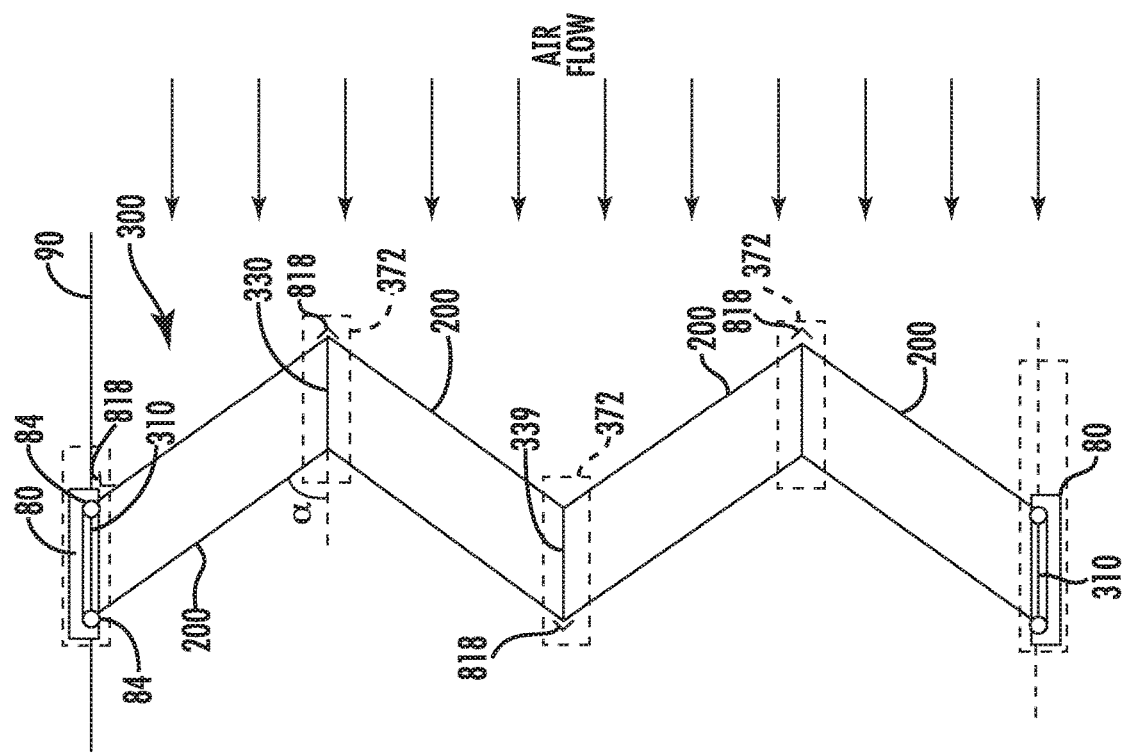
FIGS. 3A and 3B show front and side views of a filter assembly of the filter modules in use.
Figure 3A:
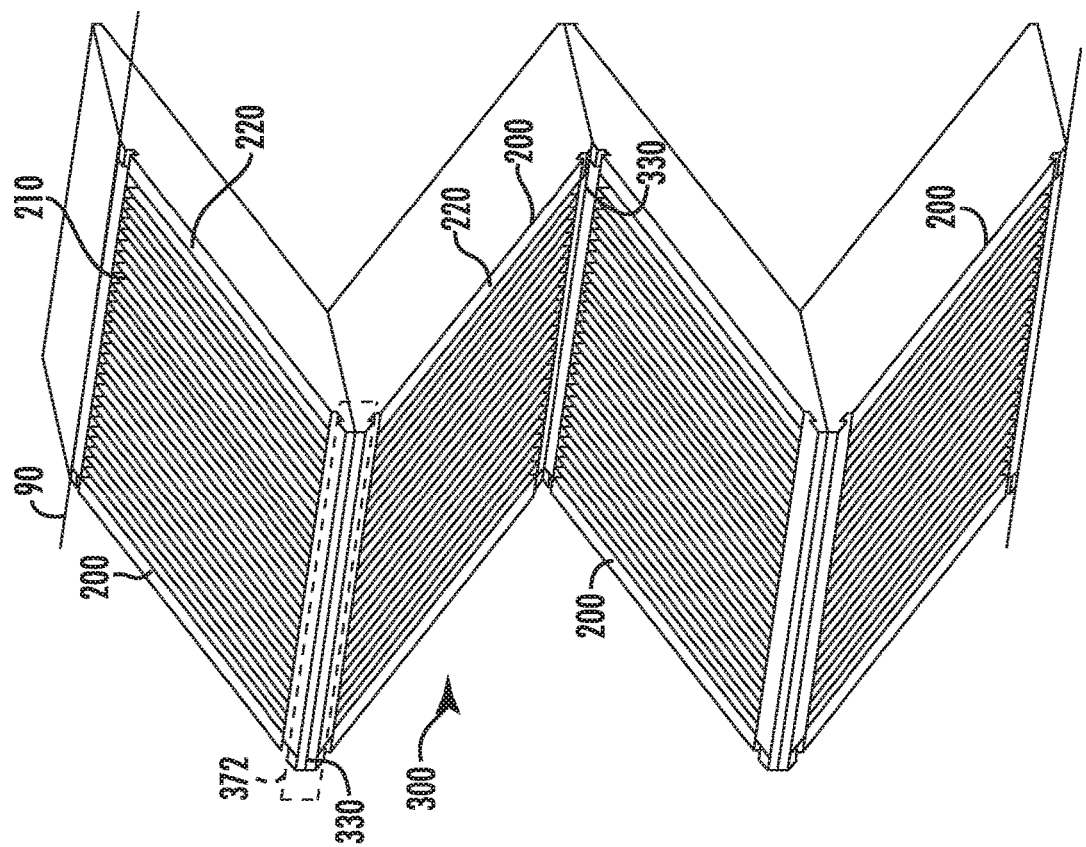

In order to achieve more surface area exposure of the filter media 214, 414 to the airflow, the filter module may be at an angle to the airflow of alpha, which may be 12, 18-21, 30 or other degrees as best seen in FIGS. 3A and 3B in which stacked filter modules 200 comprise an air filter 300 within an air passage 90. In such an air filter 300, the areas of less flow 372 near seams 330 are minimized when compared to similar areas 70, 72 in traditional filters. The seams 330 may be welded, glued, or sealed to prevent air flow therethrough, and each filter media may have one edge towards the air flow, and another away from the air flow. The seams 330 may also be covered by triangular or other appropriately shaped channels 818 of a filter frame 810 (FIGS. 8A and 8B), which channels 818 may be at any filter seam 330, but more likely at the "points" where the filters meet. It should be appreciated that although the filter media 214 shown in FIGS. 3A and 3B is shown in the vertical configuration, it could also be in the horizontal configuration of FIGS. 4A-4D.

Figure 6A:
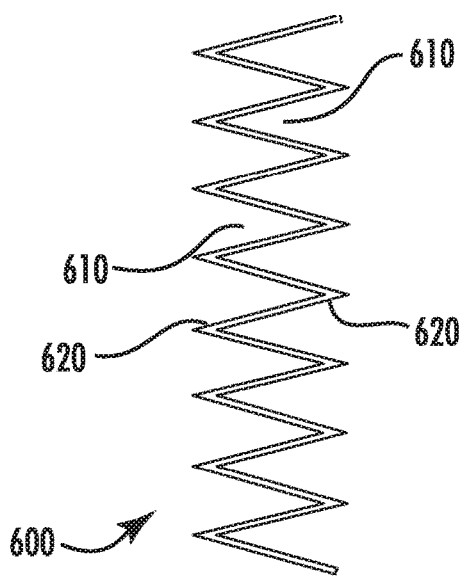
FIGS. 6A, 6B, 6C, and 6D show an alternative filter media.
Figure 6B:
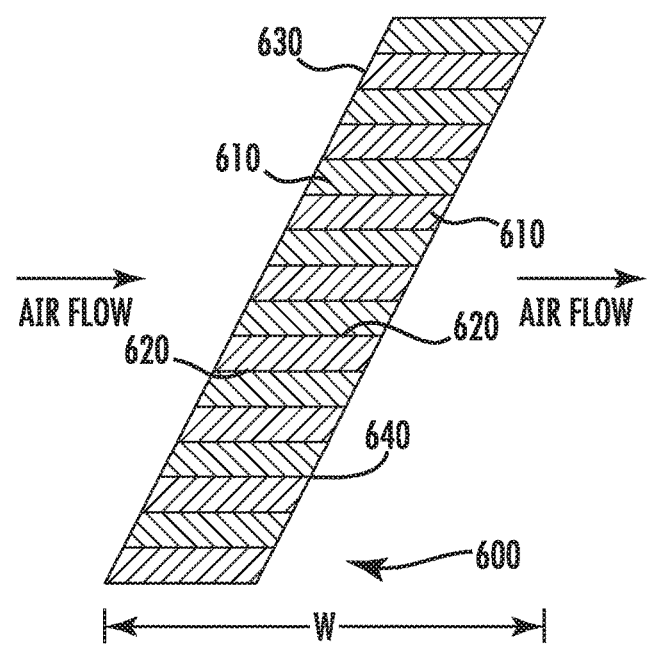
Figure 6C:
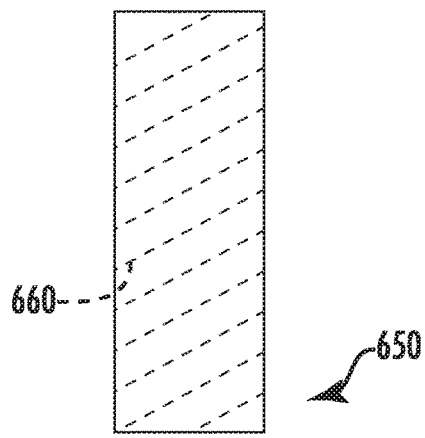

Although what is shown thus is a flat filter media with spacers forming channels, the filter media 600 could be pleated as shown in FIGS. 6A-6C. In such a filter media 600, alternating pleat peaks 620 form channels 610 for air passage therethrough, and the filter media 600 may be oriented horizontally or vertically, to create channels 610 therethrough.

The pleated filter media 600 may be formed as shown, namely with evenly cut facing 630 and trailing 640 edges.

An alternative forming of such a pleated filter 600 may involve folding a roughly rectangular-shaped filter media 650 and folding it in alternating directions along folds 660 to result in an angled media 650 as shown in FIG. 6C. The pleated filter media 600 may also be formed from parallelogram flat stock to form different desired channel configurations.

Figure 6D:
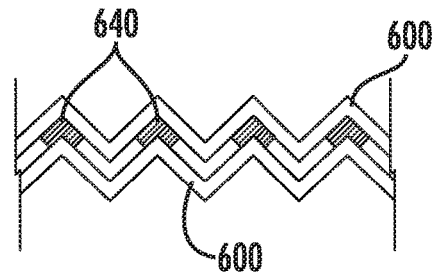

FIG. 6D shows stacking of the pleater filter 600 in a way that it could form an air filter, where layers of the pleated filter media are separated by spacers 640, to create channels therethrough.

Figure 6E:
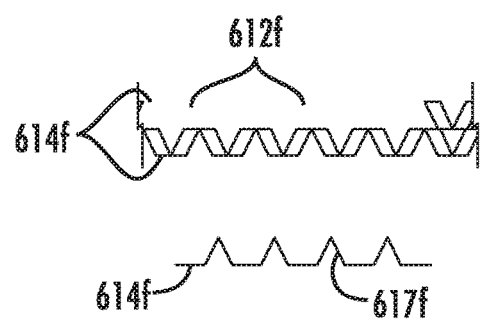
FIG. 6E shows yet an alternate filter media arrangement.

FIG. 6E shows an alternate way of forming channels 612f within a filter media 614f using folds 617f that act as spacers between the filter media. As shown, the folds 617f separate layers of media 614f—and add a spacer 617f that has filtration properties itself.

Another configuration could be to corrugate activated carbon paper and then stacking/gluing the corrugated carbon media on an angle to achieve a similar resulting channeled structure through the corrugated channels. Yet another configuration to create channels through a filter media could be to use a honeycomb structure.

To minimize movement and protect the media, a mesh or screen may be used to keep the filter media in place.

To maintain spacing between layers of filter media, a toothed spacer (similar to a toothed comb) or preformed mesh with channels may be used to separate the layers and maintain spacing therebetween, as well as add strength.

Filter Module/Media Calculations and Testing

If the width of the module frame 220 is 2 inches and the angle α=20 degrees (approximately angle of current configuration of three modules in a 24×24 duct), then the horizontal path length of the air is H or 5.85 inches (see equations 1-4). This is almost three times the path length (2 inches) in the current media exposure.

$$\sin\alpha = \frac{O}{H} \qquad \text{Equation 1}$$

$$\sin 20 = \frac{2.0}{H} \qquad \text{Equation 2}$$

$$H = \frac{2.0}{0.3420} \qquad \text{Equation 3}$$

$$H = 5.85 \text{ inches} \qquad \text{Equation 4}$$

Testing shows reducing face velocity through the media increases the efficiency and has a far larger impact on the length of the MTZ than comparable reductions in the contaminant concentration. For example, MTZ length at 1 ppm $H_2S$ at 500 ft/min is 4.8 inches compared to 2.8 inches at 100 ft/min. In contrast, the MTZ length is only reduced to 4.6 inches at 0.1 ppm $H_2S$ and 500 ft/min—a ten-fold decrease in concentration. When examining efficiency, certain honeycomb media with 1 ppm $H_2S$ after 120 days, the efficiency was measured at 45% at 500 ft/min, 90% at 250 ft/min, and 100% at 100 ft/min.

Additional testing demonstrated the pressure drop going through an air filter with channels oriented perpendicular to the face of the filter and mounted on a 45-degree angle is approximately double that of the same filter mounted vertically given the same volume of air. When the same media was assembled into an angled filter with parallel channels to the air flow the pressure drop returned to the original vertical pressure drop.

Filter Media Material

The filter media 214, 414 may be any effective media, including that described herein. The filter media 214, 414 may be an activated carbon paper media that can be made with 50 wt % coconut or wood activated carbon (honeycombs are 30 to 60 wt % carbon for IAQ applications). Coconut carbon may be used for the adsorption of VOCs due to the larger micropore volume compared to the wood-based carbon that may be used in honeycombs. The method to make the activated carbon paper allows flexibility for additives to target specific challenge gases or for the addition of alternative sorbents such as zeolites, molecular sieves, or MOFs. In contrast, honeycombs are difficult to make using many sorbents and constrained to additives compatible with the binder system.

The carbon paper media provides easy formability and manipulation—something that is less available in honeycomb and corrugated materials. Channel dimensions can easily be adjusted to decrease the MTZ length or pressure drop by changing the separation of layers and angle of the path length or angle of channels. In contrast, honeycombs require expensive dies for each configuration (wall thickness and channel dimensions). Further, papers with different sorbents or properties could be combined in the same module.

Another option for activated carbon media such as that shown in U.S. Pat. Nos. 6,355,330, 5,147,722, and 5,792,513, incorporated by reference as if fully set forth herein, that use a polymer such as polypropylene (PP) or polyethylene (PE) that binds activated carbon granules or powder and is then sandwiched between a thin nonwoven media. In such a media, the center media may be over 80 wt % activated carbon and the polymer binder does not blind any of the activated carbon pores.

Filter Material with Supporting Framework

FIGS. 7A and 7B show a filter module 700 with filter media 710 supported on a structure that may include a support beam 720. The filter media 710 comprises individual sheet members 710 mounted on the beam (s) 720. Spacers 730 ensure consistent spacing between the media 710 and help form consistent cross-sectioned air channels 740.

FIGS. 7C and 7D show alternate embodiments of the support structure. FIG. 7C shows the beam 720 and spacer 730 mounted through a center of the members 710. FIG. 7D shows the beam 720a and spacer 730a mounted at opposite edges of the members 710a.

The configuration in FIGS. 7A-7D could mount the media 710 in a horizontal (as shown) or vertical direction as shown in in FIG. 7E, that shows the filter media 710e, beams 720e, spacers 730e.

Figure 8A:
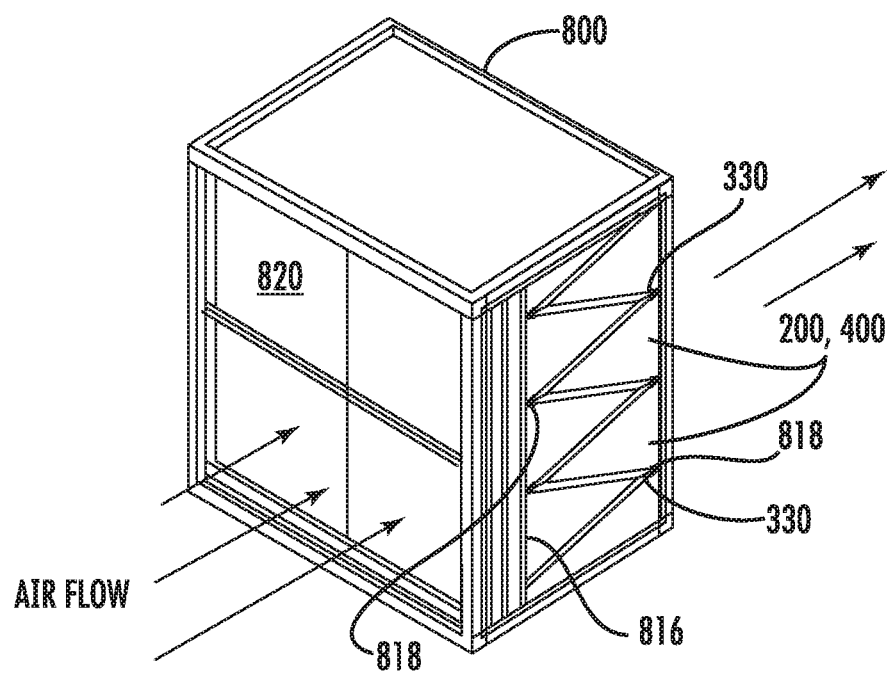
FIGS. 8A and 8B show a filter housing.
Figure 8B:
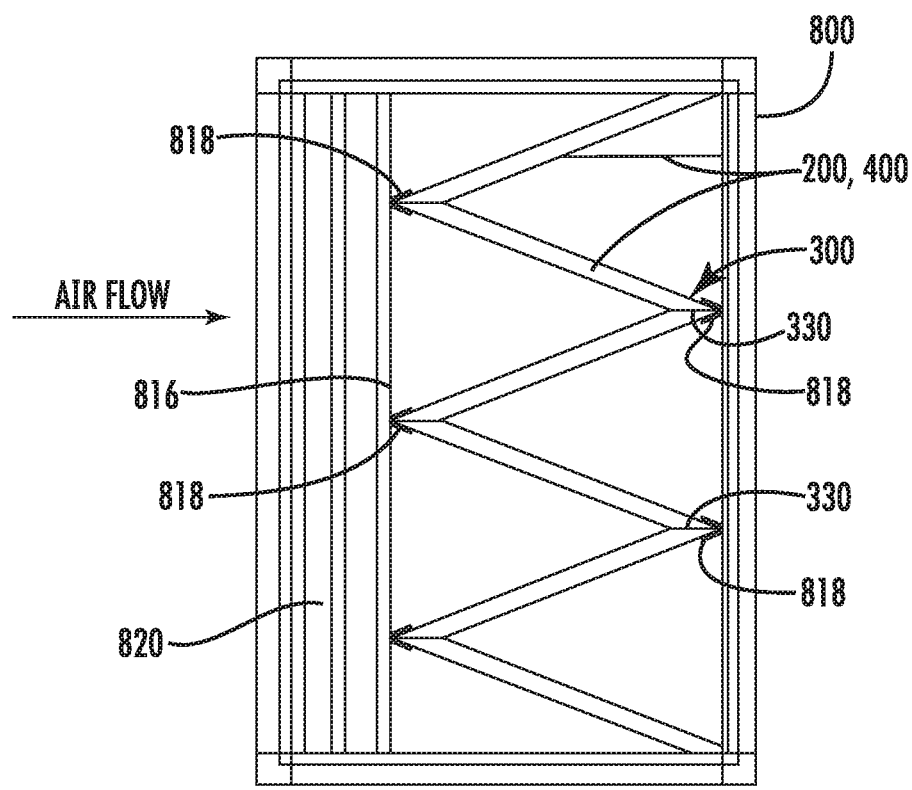

FIGS. 8A and 8B show a filter frame 800 for use with the filter modules 200, 400 described herein. The filter frame 800 includes a removable particle filter 820 and the air filter 300 already described. The particle filter 820 may filter particles so that carbon adsorbent filters 200, 400 do not become clogged with particles. The channels 818 may be attached to upright frame members 816 mounted perpendicular to the airflow in order to direct airflow from the seams 330 as well as hold individual modules 200 together to form the entire air filter 300 gas phase removal section.

Further, banks of filter modules 200, 400 could be combined in series in the airstream and/or combined with other systems or technologies to deliver the required air quality.

While the invention has been described with reference to the embodiments above, a person of ordinary skill in the art would understand that various changes or modifications may be made thereto without departing from the scope of the claims.

The invention claimed is:

1. A filter media module for use in an air filter to filter contaminants comprising:
   a filter frame; and
   a filter media removably mounted within the filter frame and defining a thickness of the filter media, wherein the filter media comprises channels therethrough,
   wherein the channels are defined by spacers, wherein the channels and the spacers are shaped in predetermined arrangements, wherein the channels define a channel path length that is longer than the thickness of the filter media, wherein the channels extend through the thickness of the filter media, wherein the filter media comprises more than two layers of filter media, wherein the more than two layers of filter media are separated by the spacers, and wherein the more than two layers of filter media are parallel to each other.

2. The filter media module for use in the air filter of claim 1, wherein the spacers have a circular shape.

3. The filter media module for use in the air filter of claim 1, wherein the spacers have an elongated shape.

4. The filter media module for use in the air filter of claim 1, wherein the spacers are an adhesive.

5. The filter media module for use in the air filter of claim 4, wherein the adhesive connects the more than two layers of filter media.

6. The filter media module for use in the air filter of claim 4, wherein the adhesive does not emanate VOCs.

7. The filter media module for use in the air filter of claim 1, wherein the spacers between the more than two layers of the filter media form the channels.

8. The filter media module for use in the air filter of claim 1, wherein the filter media comprises an activated carbon material.

9. The filter media module for use in the air filter of claim 8, wherein the activated carbon material comprises carbon granules or powder that is located between nonwoven media.

10. The filter media module for use in the air filter of claim 1, wherein the more than two filter media layers are stacked horizontally.

11. The filter media module for use in the air filter of claim 1, wherein the more than two filter media layers are stacked vertically.

12. The filter media module for use in the air filter of claim 1, wherein the filter media is angled to a direction of airflow at an angle of 18-21 degrees.

13. The filter media module for use in the air filter of claim 1, wherein the filter media comprises a pleated filter material.

14. The filter media module for use in the air filter of claim 1, wherein the channels are entirely oriented parallel to airflow.

15. The filter media module for use in the air filter of claim 1, wherein the channels are oriented such that they terminate before a trailing end of the filter media module.

16. The filter media module for use in the air filter of claim 1, wherein the channels are partially oriented at an angle to airflow.

17. The filter media module for use in the air filter of claim 1, wherein the spacers define the bottom and tops of the channels and also space apart the more than two layers of filter media.

18. The filter media module for use in the air filter of claim 1, wherein the spacers are circular beads formed in parallel rows.

19. The filter media module for use in the air filter of claim 1, wherein the channels are shaped in parallel arrangements.

\* \* \* \* \*